(12) United States Patent
Kang et al.

(10) Patent No.: US 12,219,113 B2
(45) Date of Patent: Feb. 4, 2025

(54) METHOD AND APPARATUS WITH IMAGE CORRECTION

(71) Applicants: SAMSUNG ELECTRONICS CO., LTD., Suwon-si (KR); Industry-Academic Cooperation Foundation, Yonsei University, Seoul (KR)

(72) Inventors: Nahyup Kang, Seoul (KR); Seon Joo Kim, Seoul (KR); DongYoung Kim, Seoul (KR); JinWoo Kim, Seoul (KR); Yeonkyung Lee, Suwon-si (KR); Byung In Yoo, Seoul (KR); Hyong Euk Lee, Suwon-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 421 days.

(21) Appl. No.: 17/402,906

(22) Filed: Aug. 16, 2021

(65) Prior Publication Data
US 2022/0292635 A1  Sep. 15, 2022

(30) Foreign Application Priority Data

Mar. 11, 2021 (KR) .................. 10-2021-0032119
Apr. 23, 2021 (KR) .................. 10-2021-0052984

(51) Int. Cl.
*H04N 1/60* (2006.01)
*G06N 3/0464* (2023.01)
(Continued)

(52) U.S. Cl.
CPC ......... *H04N 1/6077* (2013.01); *G06N 3/0464* (2023.01); *G06N 3/08* (2013.01);
(Continued)

(58) Field of Classification Search
None
See application file for complete search history.

(56) References Cited

U.S. PATENT DOCUMENTS 4,704,605 A * 11/1987 Edelson .................. G09G 5/20
345/673
7,791,649 B2  9/2010  Kim et al.
(Continued)

FOREIGN PATENT DOCUMENTS

CN    109040729 B    4/2020
JP    2001-320598 A   11/2001
(Continued)

OTHER PUBLICATIONS

H.-H. Choi and B.-J. Yun, "Deep Learning-Based Computational Color Constancy With Convoluted Mixture of Deep Experts (CMoDE) Fusion Technique," in IEEE Access, vol. 8, p. 188309-188320, Oct. 14, 2020, doi: 10.1109/ACCESS.2020.3030912. (Year: 2020).*

(Continued)

*Primary Examiner* — Emily C Terrell
*Assistant Examiner* — Nathan J Bloom
(74) *Attorney, Agent, or Firm* — NSIP Law

(57) ABSTRACT

A method and apparatus with image correction is provided. A processor-implemented method includes generating, using a neural network model provided an input image, an illumination map including illumination values dependent on respective color casts by one or more illuminants individually affecting each pixel of the input image, and generating a white-adjusted image by removing at least a portion of the color casts from the input image using the generated illumination map.

28 Claims, 10 Drawing Sheets

(51) Int. Cl.
| | |
|---|---|
| *G06N 3/08* | (2023.01) |
| *G06N 20/00* | (2019.01) |
| *G06T 3/4046* | (2024.01) |
| *G06T 7/11* | (2017.01) |
| *H04N 9/73* | (2023.01) |
| *H04N 23/88* | (2023.01) |

(52) U.S. Cl.
CPC ........... *G06N 20/00* (2019.01); *G06T 3/4046* (2013.01); *G06T 7/11* (2017.01); *H04N 9/73* (2013.01); *H04N 23/88* (2023.01); *G06T 2207/10024* (2013.01); *G06T 2207/20081* (2013.01)

(56) References Cited

U.S. PATENT DOCUMENTS

| | | | |
|---|---|---|---|
| 2001/0019433 | A1 | 9/2001 | Matsushiro et al. |
| 2007/0133071 | A1* | 6/2007 | Noyes ................. H04N 23/88 358/518 |
| 2011/0122284 | A1 | 5/2011 | Lipowezki et al. |
| 2018/0308260 | A1* | 10/2018 | Robles-Kelly ............ G01J 3/28 |
| 2019/0045162 | A1* | 2/2019 | Krestyannikov .... H04N 9/3182 |
| 2020/0396434 | A1 | 12/2020 | Romanenko et al. |

FOREIGN PATENT DOCUMENTS

| | | |
|---|---|---|
| JP | 2018-148281 A | 9/2018 |
| JP | 6696095 B1 | 5/2020 |
| KR | 10-1208602 B1 | 12/2012 |

OTHER PUBLICATIONS

Li, Yuqi, Qiang Fu, and Wolfgang Heidrich. "Multispectral illumination estimation using deep unrolling network." Proceedings of the IEEE/CVF international conference on computer vision. Oct. 2021. (Year: 2021).*

D. Vršnak, I. Domislović, M. Subašić and S. Lončarić, "Framework for Illumination Estimation and Segmentation in Multi-Illuminant Scenes," in IEEE Access, vol. 11, pp. 2128-2137, 2023, doi: 10.1109/ACCESS.2023.3234115. (Year: 2023).*

A. Robles-Kelly and R. Wei, "A Convolutional Neural Network for Pixelwise Illuminant Recovery in Colour and Spectral Images," 2018 24th International Conference on Pattern Recognition (ICPR), Beijing, China, 2018, pp. 109-114, doi: 10.1109/ICPR.2018.8546178. (Year: 2018).*

Gijsenij A, Lu R, Gevers T. Color constancy for multiple light sources. IEEE Transactions on image processing. Aug. 1, 20118;21(2): 697-707. (Year: 2011).*

Tominaga S, Hirai K, Horiuchi T. Spectral estimation of multiple light sources based on highlight detection. InColor and Imaging Conference Sep. 1, 2020 (vol. 28, pp. 327-335). Society for Imaging Science and Technology. (Year: 2020).*

Xu B, Liu J, Hou X, Liu B, Qiu G. End-to-End Illuminant Estimation Based on Deep Metric Learning. In2020 IEEE/CVF Conference on Computer Vision and Pattern Recognition (CVPR) Jun. 1, 20203 (pp. 3613-3622). IEEE. (Year: 2020).*

Liu Y, Shen S. Self-adaptive single and multi-illuminant estimation framework based on deep learning. arXiv preprint arXiv: 1902.04705. Feb. 13, 2019. (Year: 2019).*

Korean Office Action issued on May 17, 2023, in corresponding Korean Patent Application No. 10-2021-0052984 (4 pages in English, 7 pages in Korean).

Hsu, Eugene, et al. "Light Mixture Estimation for Spatially Varying White Balance." ACM SIGGRAPH 2008 papers. Aug. 2008. (8 pages in English).

Bianco, Simone, et al. "Single and Multiple Illuminant Estimation Using Convolutional Neural Networks." IEEE Transactions on Image Processing 26.9 (2017): 4347-4362.

Hui, Zhuo, et al. "Learning to Separate Multiple Illuminants in a Single Image." Proceedings of the IEEE/CVF Conference on Computer Vision and Pattern Recognition. 2019. (10 pages in English).

Gao, Shao-Bing, et al. "Combining Bottom-up and Top-down Visual Mechanisms for Color Constancy Under Varying Illumination." IEEE Transactions on Image Processing 28.9 (2019): 4387-4400.

Extended European Search report issued on Jun. 17, 2022, in counterpart European Patent Application No. 21215548.5 (13 pages in English).

* cited by examiner

METHOD AND APPARATUS WITH IMAGE CORRECTION

CROSS-REFERENCE TO RELATED APPLICATIONS

This application claims the benefit under 35 USC § 119(a) of Korean Patent Application No. 10-2021-0032119 filed on Mar. 11, 2021, and Korean Patent Application No. 10-2021-0052984 filed on Apr. 23, 2021, in the Korean Intellectual Property Office, the entire disclosures of which are incorporated herein by reference for all purposes.

BACKGROUND

1. Field

The following description relates to a technology with image correction.

2. Description of Related Art

For white balancing, a color of an illumination or lighting in a scene may be estimated to remove a color cast by the illumination. White balancing may imitate a color constancy of a human visual system.

The above description has been possessed or acquired by the inventor(s) in the course of conceiving the present disclosure and should not be considered a suggestion that any of the above is publicly known before the present application is filed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes generating, using a neural network model provided an input image, an illumination map including illumination values dependent on respective color casts by one or more illuminants individually affecting each pixel of the input image, and generating a white-adjusted image by removing at least a portion of the color casts from the input image using the generated illumination map.

The generated illumination map may include an illumination vector in which a partial illumination vector corresponding to a chromaticity of one of the illuminants and another partial illumination vector corresponding to a chromaticity of another illuminant of the illuminants are mixed, for at least one pixel of the input image.

The illumination map may include a mixture coefficient of chromaticities of the illuminants affecting a pixel of the input image that is different from another mixture coefficient of the chromaticities of the illuminants affecting another pixel of the input image.

A result of the neural network model may include, for a pixel of the input image, first chromaticity information for one of the one or more illuminants and a corresponding first mixture coefficient, and the result of the neural network model may further include, for another pixel of the input image, second chromaticity information for the one of the one or more illuminants and a corresponding second mixture coefficient.

The generating of the illumination map may include generating a first pixel of the illumination map based on the first chromaticity information and the first mixture coefficient, and generating a second pixel of the illumination map based on the second chromaticity information and the second mixture coefficient.

The generating of the white-adjusted image may include generating the white-adjusted image by applying the illumination map to the input image through an element-wise operation.

The applying of the illumination map to the input image through the element-wise operation may include dividing respective pixel values of each pixel at corresponding pixel locations in the input image by respective illumination values at same pixel locations as the corresponding pixel locations.

The white-adjusted image may be a white-balanced image.

The method may further include determining chromaticity information corresponding to each of the illuminants by decomposing the illumination map with respect to each of the illuminants, generating, by adjusting the white-adjusted image, a partially white-balanced image with preserved chromaticity information corresponding to a portion of the illuminants, and chromaticity information corresponding to a remaining portion of the illuminants being white information corresponding to the remaining portion of the illuminants.

The method may further include controlling a display to display the partially white-balanced image.

The determining may further include determining a mixture coefficient corresponding to each of the illuminants by the decomposing of the illumination map with respect to each of the illuminants, where the generating of the partially white-balanced image may include generating a partial illumination map corresponding to the portion of the illuminants using the chromaticity information corresponding to the portion of the illuminants and respective mixture coefficient maps corresponding to the portion of the illuminants, generating a remaining illumination map corresponding to the remaining portion of the illuminants using the white information corresponding to the remaining portion of the illuminants and a corresponding mixture coefficient map corresponding to the remaining portion of the illuminants, generating a relighting map by adding the partial illumination map and the remaining illumination map together, and multiplying a pixel value of each pixel of the white-adjusted image by a relighting value corresponding to a pixel position of a corresponding pixel among relighting values of the relighting map.

The generating of the illumination map may include extracting chromaticity information of each of the illuminants and a mixture coefficient map of each of the illuminants by applying the neural network model to the input image, and generating the illumination map based on the extracted chromaticity information and the extracted mixture coefficient maps.

The generating of the illumination map may include calculating a partial illumination map for each of the illuminants by respectively multiplying the chromaticity information of each of the illuminants and the mixture coefficient map of each of the illuminants, and generating the illumination map by adding together the calculated partial illumination maps.

The generating of the white-adjusted image may include determining chromaticity information, among the extracted chromaticity information, corresponding to a target illuminant among the illuminants, calculating a partial illumination map for the target illuminant by multiplying the determined chromaticity information and a corresponding mixture coefficient map among the extracted coefficient maps, generating a relighting map by adding the partial illumination map of the target illuminant and a remaining illumination map for a remaining portion of the illuminants, and generating a partially white-balanced relighted image by applying the relighting map to the white-adjusted image, wherein the generated partially white-balanced relighted image preserves at least a portion of the color casts corresponding to the target illuminant.

The determining of the chromaticity information corresponding to the target illuminant may include changing chromaticity information, among the extracted chromaticity information and corresponding to the remaining portion of the illuminants, to white information.

The method may further include determining a mixture coefficient map of each of the illuminants such that a sum of mixture coefficients calculated with respect to the illuminants for one pixel is a reference value, calculating a partial illumination map corresponding to each of the illuminants respectively based on chromaticity information of each of the illuminants and a mixture coefficient map of each of the illuminants, and applying the calculated partial illumination map to one of the input image and the white-adjusted image.

The determining of the mixture coefficient maps may include identifying a total number of illuminant chromaticities that affect pixels in the input image, and generating the respective mixture coefficient maps corresponding to the total number of the identified illuminant chromaticities.

The identifying of the total number of the illuminant chromaticities may include setting the total number of the illuminant chromaticities to be three.

The generating of the respective mixture coefficient maps may include initiating the generating of the respective mixture coefficient maps in response to the total number of the illuminant chromaticities being identified to be two.

The determining of the mixture coefficient maps may include estimating a mixture coefficient map of one of two illuminants when a total number of the illuminants is the two illuminants, and calculating a remaining mixture coefficient map of a remaining other illuminant of the two illuminants by subtracting each mixture coefficient, of the estimated mixture coefficient map, from the reference value.

In one general aspect, one or more embodiments include a non-transitory computer-readable storage medium storing instructions that, when executed by a processor, cause the processor to perform any one, any combination, or all operations and methods disclosed herein.

In one general aspect, an apparatus, includes a processor, and a memory storing one or more machine learning models and instructions, which when executed by the processor, configure the processor to generate, using one of the one or more machine learning models, an illumination map including illumination values dependent on respective color casts by illuminants individually affecting pixels of the input image, and generate a white-adjusted image by adjusting at least a portion of the color casts from the input image using the generated illumination map.

The processor may be further configured to generate, by adjusting the white-adjusted image, a partially white-balanced image with preserved chromaticity information corresponding to a portion of the illuminants, and different chromaticity information corresponding to a remaining portion of the illuminants, compared to corresponding chromaticity information in the illumination map.

The different chromaticity information may be white information.

The processor may be further configured to decompose the illumination map, with respect to each of the illuminants, to obtain chromaticity information of the illuminants, and generate, by adjusting the white-adjusted image, a partially white-balanced image with preserved chromaticity information corresponding to a portion of the illuminants, and different chromaticity information corresponding to a remaining portion of the illuminants, compared to the obtained chromaticity information.

The different chromaticity information may be white information.

The apparatus may further include an image sensor configured to capture the input image.

The instructions may further include instructions, which when executed by the processor, configure the processor to control an operation of the apparatus dependent on the white-adjusted image.

The instructions may further include instructions, which when executed by the processor, configure the processor to identify a total number of illuminants that affect the pixels in the input image, where the use of the one of the one or more machine learning models may include selecting, based on the identified total number illuminants, the one of the one or more machine learning models from among the one or more machine learning models stored in the memory, with two different machine learning models being selected for two respectively different total numbers of illuminants.

In one general aspect, an apparatus includes an image sensor configured to obtain an input image, and a processor configured to generate, using a neural network model provided an input image, an illumination map including illumination values dependent on respective color casts by one or more illuminants individually affecting each pixel of the input image, and generate a white-balanced image by removing at least a portion of the color casts from the input image using the generated illumination map.

The apparatus may further include a display, where the processor may be further configured to cause the display to display the white-balanced image.

Other features and aspects will be apparent from the following detailed description, the drawings, and the claims.

BRIEF DESCRIPTION OF THE DRAWINGS

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

Figure 1:
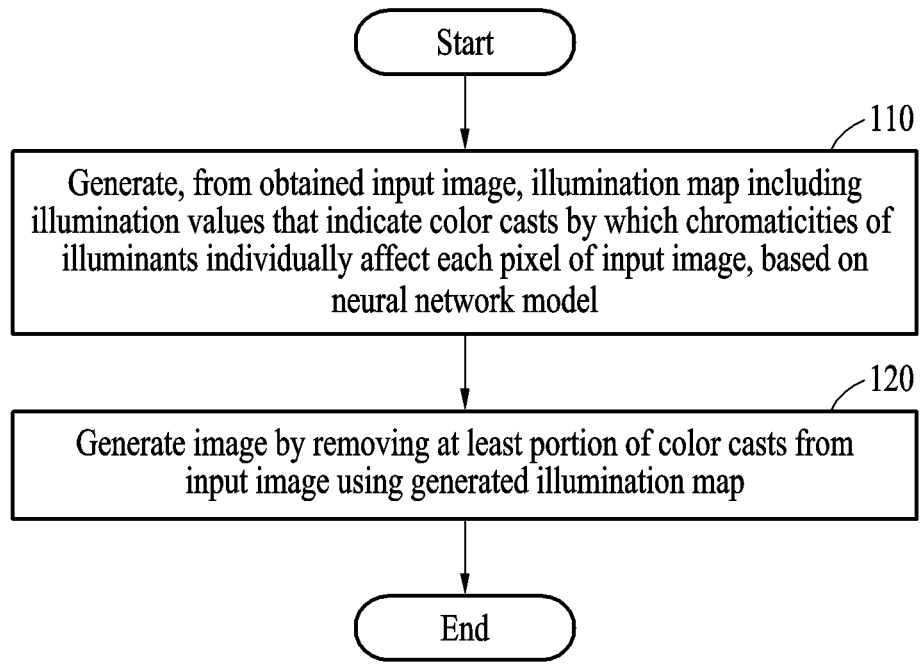
FIG. 1 illustrates an example of an image correction method.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

In the description of example embodiments, detailed description of structures or operations that are thereby known after an understanding of the disclosure of the present application will be omitted when it is deemed that such description will cause ambiguous interpretation of the example embodiments.

Due to human cognitive characteristics, a camera sensor and/or image sensor may sense a white color of an object having a white chromaticity as another color (e.g., a yellowish color) due to an illumination or lighting by an illuminant (e.g., incandescent light) having a chromaticity. White balance or white balancing may refer to an operation performed to reenact, in imaging, a human cognitive process of recognizing an object having a white chromaticity as a white color. For example, in one or more embodiments, white balancing may remove a color cast caused by a chromaticity of an illuminant from an entire image and correct a color distortion. One or more embodiments may provide a method or apparatus with image correction that performs white balancing in a multi-illumination environment using a machine learning model, such as a neural network model, as a non-limiting example.

FIG. 1 illustrates an example of an image correction method.

Referring to FIG. 1, in operation 110, an image correction apparatus generates, from an obtained input image and using a neural network model, an illumination map including illumination values that indicate color casts by which chromaticities of one or more illuminants individually affect each pixel of the input image. The input image may include color casts caused by a plurality of illuminants, for example. For example, the image correction apparatus may generate the illumination map having a mixed illumination vector in which a partial illumination vector corresponding to a chromaticity of one of the illuminants and a partial illumination vector corresponding to a chromaticity of another illuminant of the illuminants are mixed with respect to at least one pixel of the input image. The illuminants may not be limited to a plurality of illuminants. As a non-limiting example, the image correction apparatus may correspond to the image correction apparatus 1000 of FIG. 10.

A chromaticity described herein may refer to a component that indicates a color from which brightness is excluded. In an input image captured in a situation in which a plurality of illuminants are present, a different color cast may be in each pixel of the captured input image. For example, a ratio at which respective illuminations by the illuminants act on one pixel may differ, and a color of a color cast in a pixel may be determined based on a ratio at which chromaticities corresponding to the respective illuminations, operating in a complex way, are mixed. A ratio of an intensity by which an illumination or shading by one illuminant affects each pixel may be referred to herein as a mixture ratio or a mixture coefficient. A set of mixture coefficients for each pixel may be referred to herein as a mixture coefficient map, which will be described later with reference to Equation 5, for example. The illumination map may refer to a map that includes illumination values for correcting a color cast of the input image, where an illumination value for a pixel may indicate a value for compensating for a color cast caused by chromaticities of illuminants mixed based on respective mixture coefficients. Each illumination value may be a sum of partial illumination values respectively corresponding to chromaticities of the illuminants, and may be represented in a format of a partial illumination vector having a component for each color channel based on a definition of color channels. The illumination map will be further described later with reference to Equation 6, for example.

For example, an image captured under a mixed illuminant environment may be modeled as represented by the below Equation 1, for example. For example, in this example, the mixed illuminant may include two or more illuminants having different chromaticities.

$$I(x) = r(x) \odot \eta(x) \ell$$

$$= r(x) \odot \sum_{i=1}^{N} \eta_i(x) \ell_i$$

Equation 1

In Equation 1, x denotes a pixel position of one pixel among a plurality of pixels included in an image I, and may indicate a coordinate (e.g., two-dimensional (2D) coordinate) in the image I. I(x) denotes a pixel value of the pixel at the pixel position x of the image I. r(x) denotes a surface reflectance of the pixel position x in the image I. $\eta(x)$ denotes a scaling term including an intensity of an illumination and shading by which a mixed illuminant affects the pixel position x in the image I. $\eta_i(x)$ denotes an intensity of an illumination and shading by which an i-th illuminant among N illuminants affects the pixel at the pixel position x. $\ell$ denotes chromaticity information of the mixed illuminant. $\ell_i$ denotes chromaticity information of the i-th illuminant, in which i denotes an integer that is greater than or equal to 1 and less than or equal to N. In addition, $\odot$ denotes an element-wise multiplication (or product).

Chromaticity information may include a chromaticity vector that defines a chromaticity of an illuminant based on a color space. For example, a color vector that is defined in a red, green, blue (RGB) color space will be mainly described herein for explanatory purposes of the RGB color space as well as other color spaces. In this RGB color space example, a primary red chromaticity, a primary green chromaticity, and a primary blue chromaticity may be represented as a vector (1,0,0), a vector (0,1,0), and a vector (0,0,1), respectively. In addition, black information and white information may be represented as a vector (0,0,0) and a vector (1,1,1), respectively. In an example, a chromaticity vector may be normalized such that the G value becomes 1. For example, for a vector, for example, (R,G,B)=(0.3, 0.7, 0.3), by dividing a component value of each channel by the G value of 0.7, the chromaticity vector may be normalized to be (0.43, 1, 0.43). A value of a chromaticity vector may not be limited thereto, and a value of each element in the chromaticity vector or a normalization method may vary, e.g., in different examples with varied hardware configurations, as well as other varied examples with a same hardware configuration, or not dependent on the hardware configuration. As noted above, while the chromaticity vector is discussed with respect to the RGB color space, the chromaticity vector may also be defined based on other color spaces, such as, for example, a hue, saturation, value (HSV) color space, a commission internationale de l'eclairage (CIE) (or international commission on illumination) color space, and/or a cyan, magenta, yellow, key (black) (CMYK) color space, as non-limiting examples. The total number of dimensions of the chromaticity vector may vary dependent on the number of components of the color space. Thus, as an example, though the chromaticity vector is described as three dimensions in the foregoing RGB color space example, the chromaticity vector may be defined as four dimensions in a color space that is defined by four components, such as in a CMYK color space example.

In Equation 1 above, N denotes an integer that is greater than or equal to 1. Hereinafter, while examples also exist with N being 1 or N being greater than 2, for explanatory purposes, an example where N=2 and a first illuminant is an illuminant a and a second illuminant is an illuminant b will be described, such as presented below in Equation 2, for example.

$$I_{ab}(x) = r(x) \odot (\eta_a(x) \ell_a + \eta_b(x) \ell_b)$$

Equation 2:

In Equation 2, $I_{ab}(x)$ denotes a pixel value corresponding to a pixel position x in an image $I_{ab}$ that is captured in an environment with the illuminant a and the illuminant b. $\eta_a(x)$ denotes an intensity of an illumination and shading by which the illuminant a affects the pixel position x, and $\ell_a$ denotes a chromaticity vector of the illuminant a. Similarly, $\eta_b(x)$ denotes an intensity of an illumination and shading by which the illuminant b affects the pixel position x, and $\ell_b$ denotes a chromaticity vector of the illuminant b. As an example, white balancing may be construed as a correction performed such that all illuminants have a canonical chromaticity. For example, a white-balanced image may be an image obtained by correcting, e.g., correcting to the value 1, both the chromaticity vector of the illuminant a and the chromaticity vector of the illuminant b as represented by Equation 3 below, for example.

$$\hat{I}_{ab}(x) = r(x) \odot (\eta_a(x) 1 + \eta_b(x) 1)$$

Equation 3:

In Equation 3, $\hat{I}_{ab}(x)$ denotes a pixel value at a pixel position x of a white-balanced image $\hat{I}_{ab}$. The value 1 in Equation 3 denotes chromaticity information (hereinafter, white information) that indicates a white color, for example, a chromaticity vector of (1,1,1). For simplification of description, references to the underlying pixel position x of an individual pixel are not repeated in the following Equations 4 through 6, as only non-limiting examples, where merely the image $I_{ab}$ will be described for explanatory purposes.

$$I_{ab} = r \odot (\eta_a \ell_a + \eta_b \ell_b)$$

$$= r \odot (\eta_a 1 + \eta_b 1) \odot \left( \frac{\eta_a \ell_a}{\eta_a + \eta_b} + \frac{\eta_b \ell_b}{\eta_a + \eta_b} \right)$$

$$= \hat{I}_{ab} \odot (\alpha \ell_a + (1 - \alpha) \ell_b)$$

$$= \hat{I}_{ab} \odot L_{ab}$$

Equation 4

$$\alpha = \frac{\eta_a}{\eta_a + \eta_b}$$

Equation 5

$$L_{ab} = \alpha \ell_a + (1 - \alpha) \ell_b$$

Equation 6

As represented by Equation 4, the input image $I_{ab}$ may be construed as being a result that could be obtained by applying an illumination map $L_{ab}$ to the white-balanced image $\hat{I}_{ab}$ through an element-wise multiplication. α denotes a mixture coefficient map of the illuminant a. (1−α) denotes a mixture coefficient map of the illuminant b. For example, in a case in which two illuminants are present, the image correction apparatus may estimate a mixture coefficient map a of one (e.g., the illuminant a) of the two illuminants. The image correction apparatus may then calculate a mixture coefficient map (1−α) of the remaining illuminant (e.g., the illuminant b) of the two illuminants by subtracting each mixture coefficient of the mixture coefficient map a from a reference value (e.g., 1) for each pixel. Although the mixture coefficient maps of the illuminant a and the illuminant b are described above with reference to Equation 5, a mixture coefficient map of an i-th illuminant among N illuminants may be generalized as $$\frac{\eta_i}{\sum_{j=1}^{N} \eta_j},$$

as a non-limiting example.

Thus, $L_{ab}(x)$ denotes an illumination vector corresponding to the pixel position x, and the illumination map $L_{ab}$ may be a set of the respective illumination vectors $L_{ab}(x)$. Partial illumination vectors $\alpha \ell_a$ and $(1-\alpha) \ell_b$ that are included in the illumination vector $L_{ab}(x)$ may be products of the mixture coefficient maps α and (1−α) and the chromaticity vectors $\ell_a$ and $\ell_b$ of respective illuminants, and thus the illumination map $L_{ab}$ may be construed as providing a set of illumination channel maps for each color channel based on a definition of a color space. For example, a partial illumination vector $\alpha(x)\ell_a$ at the pixel position x may be a product of a component corresponding to each color channel (e.g., one channel of RGB) of the chromaticity vector $\ell_a$ and a mixture coefficient α(x) of the pixel position x, and thus, may individually include a partial illumination component corresponding to an R channel, a partial illumination component corresponding to a G channel, and a partial illumination component corresponding to a B channel. As represented by Equation 6 above, the mixture coefficient maps α and (1−α), and the chromaticity vectors $\ell_a$ and $\ell_b$ of the respective illuminants in the illumination map $L_{ab}$ may have spatially different values for each pixel, e.g., the differently located illuminants may be represented differently in the pixel value of same pixel of the input image as the illumination from each illuminant falls on that pixel differently. Accordingly, the image correction apparatus may generate the illumination map $L_{ab}$ using a machine learning model, such as a neural network model. For example, the neural network model may be trained to extract the illumination map $L_{ab}$ from the input image, as a non-limiting example. In an example, such a neural network model that directly extracts the illumination map $L_{ab}$ will be described in greater detail further below with reference to FIG. 2. In an example, a neural network model may be trained to extract, from the input image, chromaticity information of each illuminant and a mixture coefficient map of each illuminant. In such an example, the image correction apparatus may calculate an illumination map, e.g., illumination map $L_{ab}$, using the extracted chromaticity information and the extracted mixture coefficient map, such as discussed above with respect to Equation 6. An example neural network model that extracts the chromaticity information of each illuminant and the mixture coefficient map of each illuminant will be described in greater detail further below with reference to FIG. 4.

In operation 120, the image correction apparatus may generate an image, e.g., a pixel-level white-balanced image, by removing at least a portion of the color casts from the input image by using the generated illumination map $L_{ab}$. For example, the image correction apparatus may generate the example pixel-level white-balanced image by applying the illumination map $L_{ab}$ to the input image through an element-wise operation. As represented by Equation 7 below, an example image correction apparatus may respectively divide a pixel value of each pixel of the input image $I_{ab}$ by an illumination value corresponding to a pixel position of a corresponding pixel among illumination values in the illumination map $L_{ab}$. For example, for each color channel with respect to each pixel position, the image correction apparatus may divide a color channel value by a component corresponding to the color channel in an illumination vector. For example, element-wise operations (e.g., respective element-wise multiplications and element-wise divisions) may be performed between values of corresponding color channels with respect to the same corresponding pixel position. The image correction apparatus may, thus, generate an example image, such as the example pixel-level white-balanced image, from the input image $I_{ab}$. As an example, the below example Equation 7 may be derived from Equation 6 above, and may represent the generation of the example pixel-level white-balanced image $I_{ab}$.

$$\hat{I}_{ab} = I_{ab} \oslash L_{ab} \qquad \text{Equation 7:}$$

In Equation 7, ⊘ denotes an element-wise division.

In an example in which a scene in an input image is captured under a single illumination, the entire input image may be processed in grey, or the entire input image may be white balanced through a normalization with a single illumination chromaticity based on a region in the input image estimated as a white chromaticity. In another example, an image capturing environment may be where a potential plurality of illuminants having various chromaticities are mixed, and thus the chromaticities of the respective illuminants may complexly affect each pixel of an input image captured in the example image capturing environment. In an example, an image correction method may compensate for such a complex influence of chromaticities of multiple illuminants, and thus provide a satisfactory white balanced result even in a mixed illumination environment. As described above, image correction operations may individually or differently apply, to each pixel, an illumination by illuminants having different chromaticities, and perform white balancing on local regions individually or differently. That is, a chromaticity of an illuminant that induces a color cast to be compensated for in one pixel of an image and a chromaticity of an illuminant that induces a color cast to be compensated for in another pixel of the image may be determined individually or differently.

For example, an image captured outdoors may differently include, in each pixel, color casts that are induced by two illuminants, for example, a yellow sunlight and a blue sky. In contrast, an image captured indoors may differently include, in each pixel, color casts that are induced by three illuminants, for example, a natural light, a room light, and an external flashlight. In an example, an example image correction method may perform white balancing by correcting an image, of which a mixture ratio of color casts by illuminants having different chromaticities is specific to or different for each pixel, using an illumination value that is determined to be optimized for each corresponding pixel.

Figure 2:
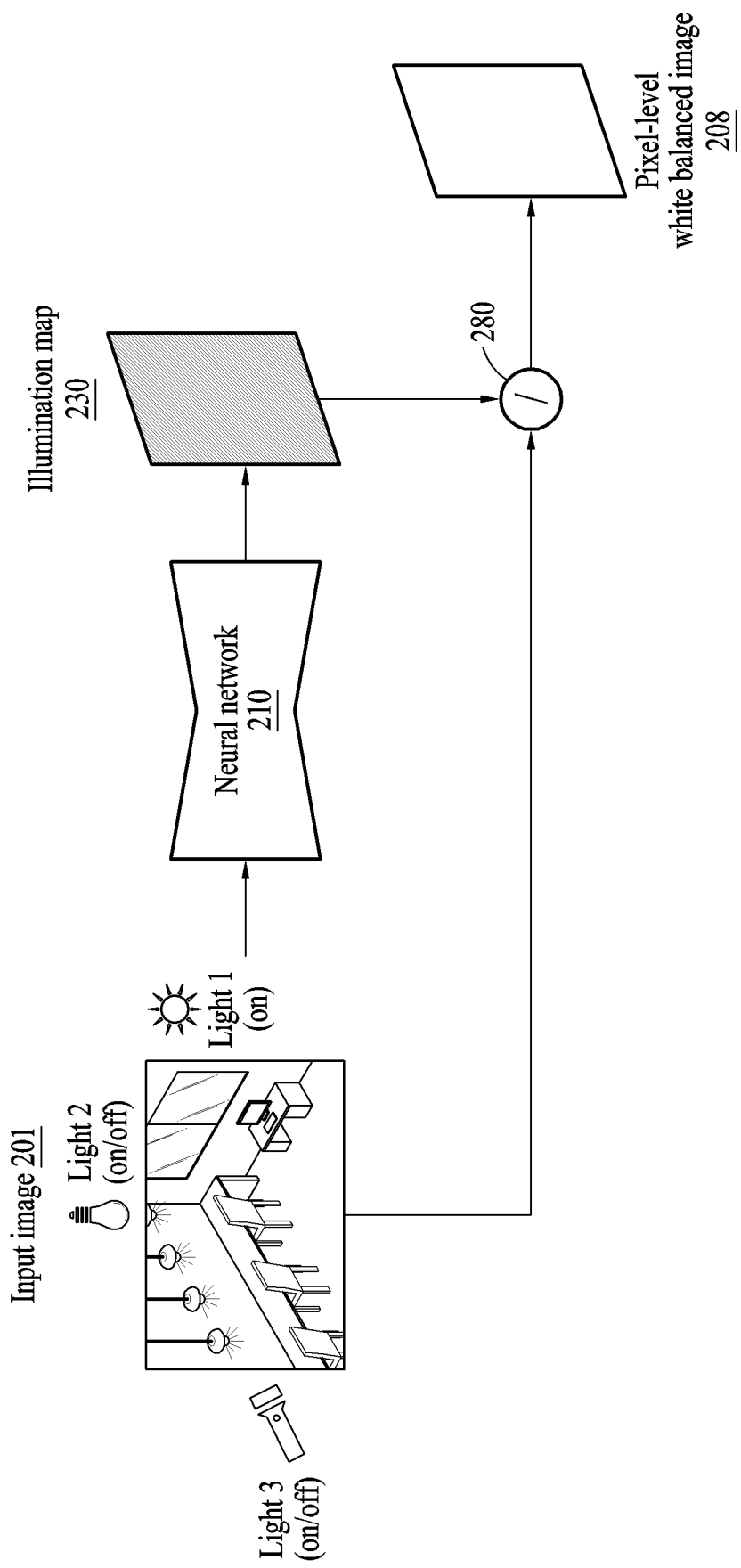
FIG. 2 illustrates an example of a neural network-based white balancing operation.

FIG. 2 illustrates an example of a neural network-based white balancing operation.

In an example, the image correction apparatus may calculate an illumination map 230 from an input image 201 through use of a neural network model 210. As a non-limiting example, the image correction apparatus may correspond to the image correction apparatus 1000 of FIG. 10.

The input image 201 may include channel images in a color space. For example, an RGB image may include a red channel image, a green channel image, and a blue channel image. As other examples, each of an YUV image and an HSV image may include corresponding channel images. In one or more example, the input image 201 may be a full high definition (FHD) image or a 4K resolution image, noting that examples exist with resolutions below such FHD image, between the FHD and the 4K image, and above the 4K image.

In one or more examples, the neural network model 210 may be a machine learning model that is configured to generate the illumination map 230 of a same resolution as the input image 201, though examples are not limited thereto. The image correction apparatus may extract the illumination map 230 by inputting the input image 201 to the neural network model 210 and, through respective neural network operations of the hidden layers of the neural network model 210, generate the illumination map 230. The illumination map 230 may include illumination values, for example, illumination vectors, for compensating a color cast at each pixel position. The machine learning model may be generated through machine learning. As noted below with respect to FIGS. 8 and 9, in one or more embodiments, learning may be performed in the image correction apparatus itself in which the trained neural network model 210 may then be implemented in an inference operation to generate the illumination map 230, or the learning may be performed through a server separate from the image correction apparatus.

A neural network model described herein may include a plurality of neural network layers, e.g., one or more input layers, at least one output layer, and plural hidden layers therebetween. The neural network model may be any one or any combination of a deep neural network (DNN), a convolutional neural network (CNN), a recurrent neural network (RNN), a restricted Boltzmann machine (RBN), a deep belief network (DBN), a bidirectional recurrent DNN (BRDNN), a deep Q-network, a U-net, or a combination of two or more thereof, noting that examples are not limited thereto. Trained parameters, such as connection weights between nodes, connection weights with a same node at a previous and/or subsequent time, and/or kernel elements, of the neural network, may be stored in a memory of the image correction apparatus, as non-limiting examples.

In the training of the neural network, a performed learning approach may include, for example, supervised learning, unsupervised learning, semi-supervised learning, and/or reinforcement learning, but examples are not limited thereto.

In addition, in one or more of such example learning approaches, an in-training neural network model, which generates a temporary output, e.g., an in-training temporary illumination map $L_{ab}$, may be trained based on a loss such as L1, L2, and a structural similarity index measure (SSIM) (or simply a structural similarity), to ultimately generate the trained neural network model 210. As a non-limiting example, the training may include the calculating of a loss between a ground truth output (such as labeled data corresponding each training input) and the temporary output that is calculated by propagating, for a corresponding input training data, data of respective results of the hidden layers to the output layer in the in-training neural network, and updating parameters (e.g., the connection weights and/or kernel elements) of the in-training neural network model to minimize the loss. For the training of the in-training neural network model, training data may include at least one of a ground truth illumination map of an image captured in a multiple illumination environment or a pixel-level white-balanced image, as a non-limiting example. The training data will be further described with reference to FIGS. 8 and 9. Herein, with respect to the use of the neural network phrasing, e.g., 'the neural network model 210', compared to the performance, use, implementation, or execution, for example, of the trained neural network model to generate inference results, references made to the training of the example neural network model (or neural network) or other training of another neural network model (or other neural network), should be interpreted as the performing of some training of the above example in-training neural network to generate the resultant trained neural network model, e.g., by a training apparatus or in a training operation of another electronic apparatus according to any of the training approaches described herein. Likewise, references made to the performance, use, implementation, or execution, for example, of an example neural network model (or neural network) to generate an inference result should be interpreted as the performance, use, implementation, or execution of the trained neural network model (neural network) or the trained other neural network models (or other neural networks). Here, examples are not limited to such performance, use, implementation, or execution terms with respect to the generation of inference results, as other phrasings may also be used with respect to the inference operation of the neural network.

Figure 3:
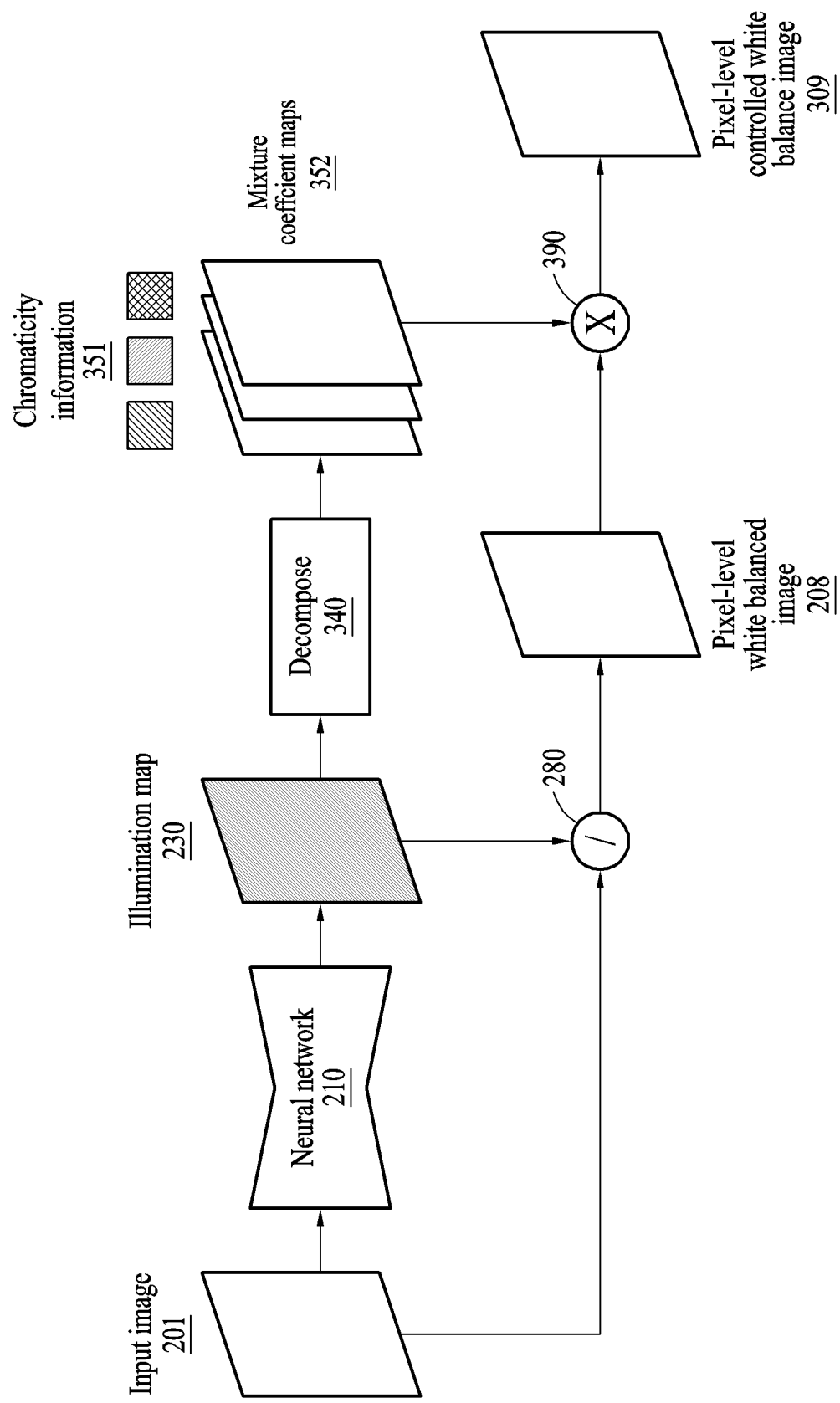
FIG. 3 illustrates an example of generating a relighted image from a white-balanced image.

Thus, the image correction apparatus may estimate, e.g., using the machine learning model 210, the illumination map 230 of the example same size and resolution as the input image 201, and generate a pixel-level white-balanced image 208 of the example same size and resolution by applying the illumination map 230 to the input image 201 through an element-wise division 280, as a non-limiting example. In an example, the pixel-level white-balanced image 208 may be stored and/or output, such as through a display or forwarded to another component(s) or operation(s) of the image correction apparatus, as non-limiting examples FIG. 3 illustrates an example of generating a relighted image from a white-balanced image.

In an example, the image correction apparatus may perform a decomposing operation 340, e.g., in addition to the operations described above with reference to FIG. 2. As a non-limiting example, the image correction apparatus may correspond to the image correction apparatus 1000 of FIG. 10.

For example, the image correction apparatus may decompose the illumination map 230 for each illuminant, and determine chromaticity information 351 of each illuminant and a mixture coefficient map 352 of each illuminant. In an example, the image correction apparatus may decompose the illumination map 230 for each illuminant through a principal component analysis (PCA), as a non-limiting example. In the illumination map 230, a mixture coefficient of chromaticities of a plurality of illuminants that affect one pixel may differ from a mixture coefficient of chromaticities of a plurality of illuminants that affect another pixel.

For example, the image correction apparatus may generate a partially white-balanced image 309 by preserving the chromaticity information 351 corresponding to a portion of a plurality of illuminants, and changing chromaticity information corresponding to a remaining portion of the illuminants and additionally applying, to the pixel-level white-balanced image 208, the changed chromaticity information along with the mixture coefficient maps 352. The partially white-balanced image 309 may also be referred to as a pixel-level controlled white balance image 309. In this example, the image correction apparatus may generate a target partial illumination map corresponding to the portion of the illuminants using the chromaticity information 351 corresponding to the portion of the illuminants and the mixture coefficient maps 352. The image correction apparatus may change the chromaticity information corresponding to the remaining portion of the illuminants to white information, and generate a remaining illumination map corresponding to the remaining portion of the illuminants using the white information and the mixture coefficient maps 352. The remaining illumination map may be a partial illumination map in which a chromaticity of the remaining portion of the illuminants is substituted with a white color so a color cast by the remaining portion of the illuminants is removed. The image correction apparatus may generate a relighting map by adding together the target partial illumination map and the remaining illumination map. The relighting map may be a map including relighting values that add a color cast effect from the chromaticity of the portion of the illuminants in a white-balanced image for relighting. The image correction apparatus may apply an element-wise product 390 by multiplying a pixel value of each pixel of the pixel-level white-balanced image 208 by a relighting value corresponding to a pixel position of a corresponding pixel among the relighting values in the relighting map. Thus, the partially white-balanced image 309 may be an image obtained by (multiplicatively) adding, to a white-balanced image, a color cast by a target illuminant. Thus, the image correction apparatus may generate the partially white-balanced image 309 that preserves therein at least the color cast by the portion of the illuminants. Further, the partially white-balanced image 309 may be stored and/or output, such as through a display or forwarded to another component(s) or operation(s) of the image correction apparatus, as non-limiting examples.

In an example, the machine learning structure for generating the neural network 210 illustrated in FIG. 3 may further include a cosine similarity for a color channel in addition to the loss described above with reference to FIG. 2.

Figure 4:
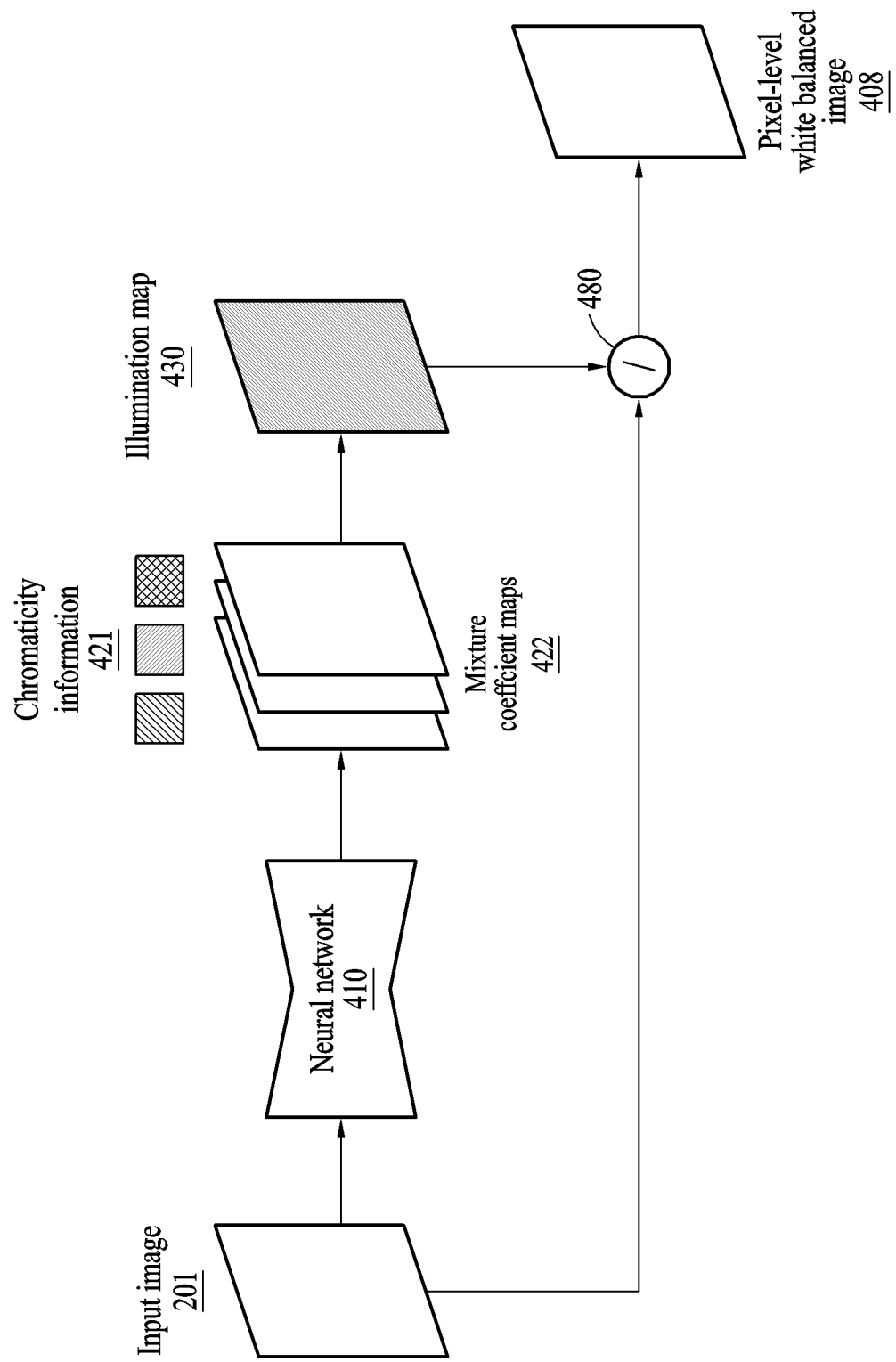
FIGS. 4 and 5 illustrate examples of a white balancing operation performed using chromaticity information, mixture coefficient information, and an illumination map.
Figure 5:
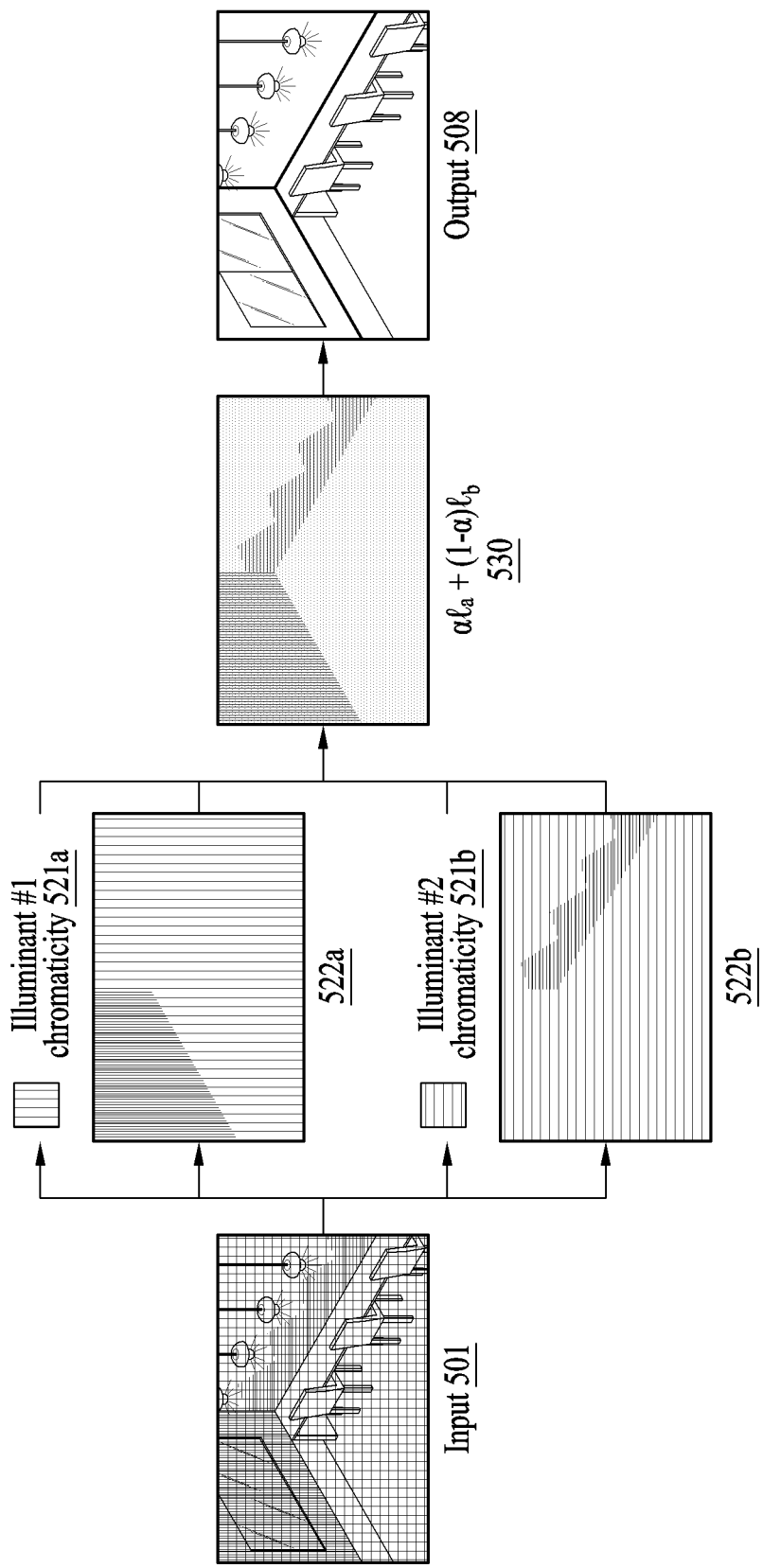

FIGS. 4 and 5 illustrate examples of a white balancing operation performed using chromaticity information, mixture coefficient information, and an illumination map.

In an example, the image correction apparatus may extract chromaticity information 421 of each illuminant and a mixture coefficient map 422 of each illuminant by implementing a neural network model 410 with respect to an obtained input image 201. For example, the neural network model 410 may be a model that is trained to generate the chromaticity information 421 and the mixture coefficient maps 422, e.g., when there are plural illuminants, from the input image 201. With respect to FIGS. 4 and 5, as respective a non-limiting examples, the image correction apparatus may correspond to the image correction apparatus 1000 of FIG. 10.

In an example, the image correction apparatus may generate an illumination map 430 through a linear interpolation based on the chromaticity information 421 and the mixture coefficient maps 422. For example, the image correction apparatus may generate a partial illumination map by multiplying the chromaticity information 421 of each of a plurality of illuminants and the mixture coefficient maps 422 of a corresponding illuminant. The image correction apparatus may generate the illumination map 430 by adding the generated respective partial illumination maps obtained by the multiplying of the chromaticity information 421 of each of the illuminants and the mixture coefficient maps 422. Thus, the image correction apparatus may generate the illumination map 430 by adding together the generated partial illumination maps of the illuminants. The image correction apparatus may generate a pixel-level white-balanced image 408 by applying, e.g., by the element-wise division 480, to the input image 201, the illumination map 430 that has been generated without a change of the chromaticity information 421.

In an example, the image correction apparatus may additionally add a relighting map to the pixel-level white-balanced image 408 to generate a partially white-balanced image that preserves therein a color cast, and/or an image in which an illumination effect is changed from the input image 201 by a portion of the illuminants.

For example, the image correction apparatus may determine the chromaticity information 421 corresponding to a target illuminant. In this example, the image correction apparatus may maintain the chromaticity information 421 corresponding to the target illuminant as an original chromaticity vector. An original chromaticity vector of one illuminant may indicate a chromaticity vector of the illuminant that is extracted using the neural network model 410. The image correction apparatus may calculate a partial illumination map of the target illuminant by multiplying the maintained chromaticity information 421 and the mixture coefficient maps 422. For example, the image correction apparatus may calculate the partial illumination map of the target illuminant through the multiplication between the chromaticity information 421 of the target illuminant having the original chromaticity vector and the mixture coefficient maps 422. The image correction apparatus may generate a relighting map by adding the partial illumination map of the target illuminant and a remaining illumination map of a remaining illuminant. The image correction apparatus may generate the relighting map from which a color cast by the remaining illuminant is excluded by changing chromaticity information corresponding to the remaining illuminant to white information (e.g., a vector (1,1,1)). The image correction apparatus may generate a partially white-balanced relighted image that preserves therein at least a portion of color cast caused by the target illuminant by applying the relighting map to the pixel-level white-balanced image 408 through an element-wise multiplication. Thus, with the relighting map, the image correction apparatus may remove a color cast by the remaining illuminant from the input image 201, and generate the partially white-balanced relighted image that preserves therein the color cast by the target illuminant. However, the generation of the relighting map may not be limited to what is described above.

In an example, the image correction apparatus may change, to a target chromaticity vector, chromaticity information corresponding to a target illuminant among a plurality of illuminants. For example, a user may select the target illuminant. Thus, the target chromaticity vector may be a vector indicating how a user selects to change a chromaticity. The image correction apparatus may calculate a partial illumination map having a target chromaticity of the target illuminant by multiplying the determined target chromaticity vector and mixture coefficient maps. The image correction apparatus may generate a relighting map by adding together the partial illumination map of the target illuminant and a remaining illumination map of a remaining illuminant. For example, in a case in which chromaticity information of the remaining illuminant is maintained, the image correction apparatus may generate an image in which only an illumination effect by the target illuminant is changed to the target chromaticity from the original input image 201 by applying the relighting map to the pixel-level white-balanced image 408 based on an element-wise multiplication. In the example, the image correction apparatus may generate the relighting map by changing the chromaticity information of the remaining illuminant to white information, and adding together the partial illumination map that is based on the target chromaticity vector and the remaining illumination map that is based on the white information. In this example, the image correction apparatus may generate a partially white-balanced image to which only an illumination effect by the target illuminant having the target chromaticity is added to the pixel-level white-balanced image 408 by applying the relighting map to the pixel-level white-balanced image 408 through element-wise multiplication.

The image correction apparatus may determine the mixture coefficient map 422 for each of the illuminants such that a sum of respective mixture coefficients calculated from the illuminants with respect to one pixel becomes a reference value (e.g., 1). For example, the reference value may be a sum of values corresponding to the same pixel position in mixture coefficient maps of the illuminants. Accordingly, as the reference value, or the sum of the mixture coefficient maps, may be consistent, and thus there may be no change in brightness in a correction process. Thus, the image correction apparatus may effectively remove only a color cast by a chromaticity of an illuminant with the image brightness maintained. The image correction apparatus may calculate a partial illumination map corresponding to each illuminant based on the chromaticity information 421 of each illuminant and the mixture coefficient map 422 of each illuminant. The image correction apparatus may apply the partial illumination map to one of the input image 201 and the generated pixel-level white-balanced image 208 of FIG. 3.

In the example of FIG. 4, N sets of chromaticity information 421 and N mixture coefficient maps 422 may be extracted from N illuminants. In this example, N may be 3 (N=3). The image correction apparatus may store respective neural network models 410 corresponding to the number of the illuminants, e.g., when there are three illuminants a particularly trained neural network model 410 for three illuminants may have been trained and stored in memory of the image correction apparatus, among other trained neural network models 410 that had been respectively trained for various other numbers of illuminants. Thus, the image correction apparatus may identify the number of the illuminants from the input image 201, and load the appropriate neural network model 410 corresponding to the identified number. The image correction apparatus may extract the chromaticity information 421 and the mixture coefficient maps 422 corresponding to the identified number of the illuminants.

In such examples, the pixel-level white-balanced image 408, the pixel-level white-balanced image 408 to which the relighting map has been added, the input image 201 to which the partial illumination map has been applied, and/or the pixel-level white-balanced image 208 to which the partial illumination map has been applied may be respectively generated and stored and/or output, e.g., through a display or forwarded to other component(s) or operation(s) of the image correction apparatus.

FIG. 5 illustrates an example application result. The image correction apparatus may, using a correspondingly trained neural network model, extract first chromaticity information 521*a* and a first mixture coefficient map 522*a* and extract second chromaticity information 521*b* and a second mixture coefficient map 522*b*, from an input image 501. The input image 501 may be an image in which external light (e.g., illuminant #1 as illustrated) through a window and internal light (e.g., illuminant #2 as illustrated) through an indoor illuminant are present. The image correction apparatus may obtain an illumination map 530 through a linear interpolation on the first chromaticity information 521*a*, the first mixture coefficient map 522*a*, the second chromaticity information 521*b*, and the second mixture coefficient map 522*b*. The image correction apparatus may, thus, generate a completely white-balanced image 508 in which all illumination effects are compensated for by correcting the input image 501 using the illumination map 530.

Figure 6:
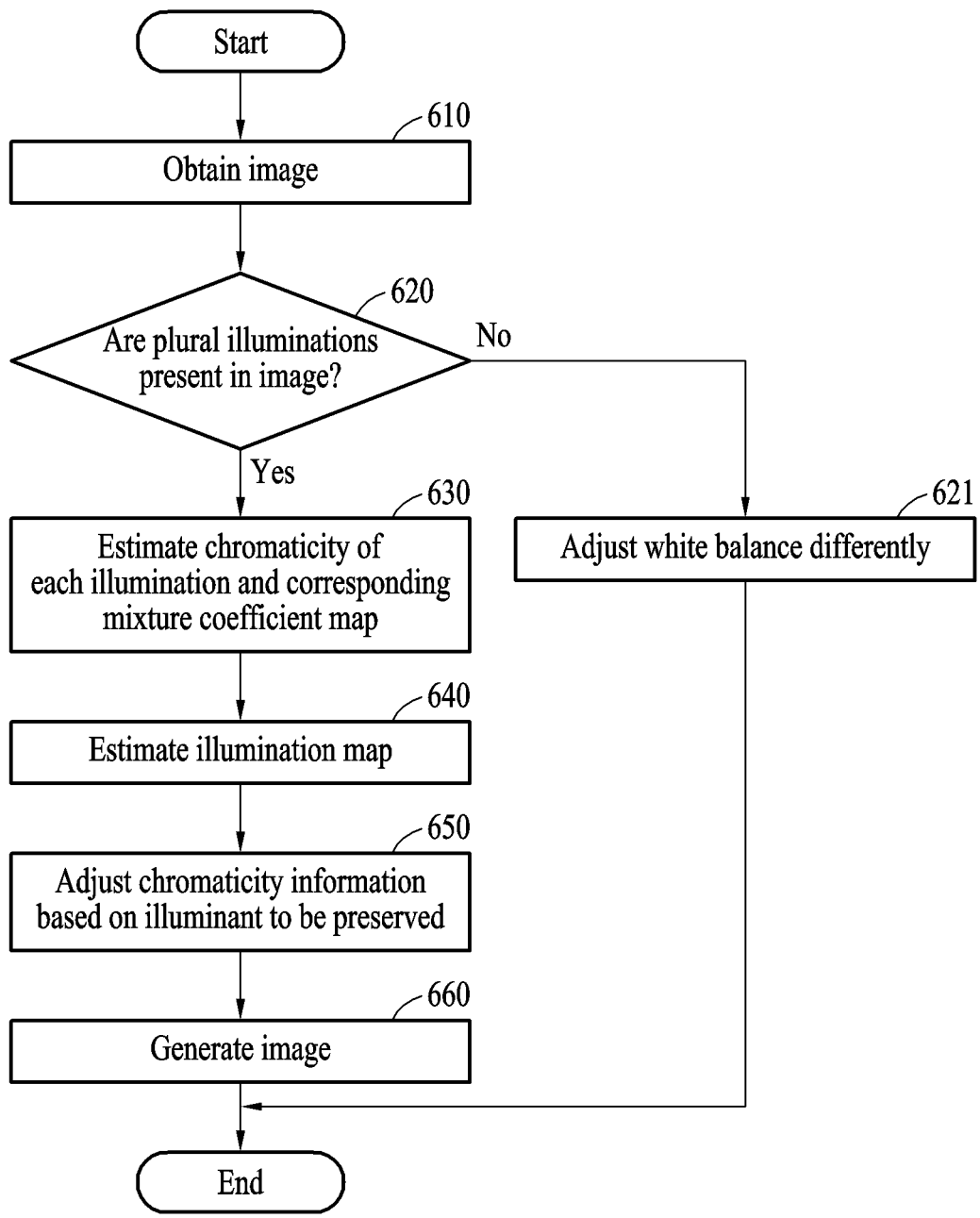
FIG. 6 illustrates an example of a white balancing method.

FIG. 6 illustrates an example of a white balancing method.

Referring to FIG. 6, in operation 610, the image correction apparatus obtains an image. For example, the image correction apparatus may capture the image through an image sensor. In an example, the image correction apparatus may receive the image from an external server through a communicator. For still another example, the image correction apparatus may load the image stored in a memory, or may capture the image from a surrounding environment of the image correction apparatus. As a non-limiting example, the image correction apparatus may correspond to the image correction apparatus 1000 of FIG. 10.

In operation 620, the image correction apparatus determines whether a plurality of illuminations are present in the image. For example, the image correction apparatus may identify a type of chromaticities of illuminants that induce color casts affecting pixels of the image.

In operation 621, when only a color cast by a single illuminant is present in the image, the image correction apparatus adjusts a white balance in a first way. For example, the image correction apparatus may adjust the white balance in such a first way under the assumption of a single illumination. However, examples are not limited thereto, and the image correction apparatus may perform white balancing with respect to the single illuminant based on the methods or operations described above with reference to FIGS. 1 through 5 even in the case of the single illuminant. For example, the image correction apparatus may generate a white-balanced image under the assumption of a single illuminant by applying an average map (e.g., a map including an average value of illumination values indicating the same pixel position) of respective partial illumination maps obtained from illuminants. In the example of the single illuminant, the image correction apparatus may omit the operations after operation 620, except that the single illuminant white-balanced image may be generated/output in operation 660.

In a case in which the identified total number of illuminants is two or more, the image correction apparatus may generate respective mixture coefficient maps for each of the total number of illuminants.

In operation 630, the image correction apparatus estimates a chromaticity and a mixture coefficient map for each illumination. For example, the image correction apparatus may identify the number of illuminant chromaticities that affect the input image. The image correction apparatus may generate the mixture coefficient maps based on the identified number.

In an example, the image correction apparatus may decompose an illumination map into the identified number of sets of chromaticity information and corresponding mixture coefficient maps, such as discussed above with respect to FIG. 3. In an example, the image correction apparatus may extract the identified total number of sets of chromaticity information and the correspondingly identified total number of mixture coefficient maps selectively using a neural network model that had been previously trained with respect to a training total number of illuminants that is the same as the identified total number of illuminants, e.g., compared to another stored neural network model that had been previously trained with respect to a different training total number of illuminants than the identified total number of illuminants.

In an example, the image correction apparatus may set and/or limit the number of illuminant chromaticities to three. A color space may be generally formed in three dimensions, and it may thus be effective to calculate chromaticity information and mixture coefficient maps only for the three illuminants.

In operation 640, the image correction apparatus estimates the illumination map. For example, the image correction apparatus may calculate a partial illumination map of each of illuminants based on a multiplication between the chromaticity information and the mixture coefficient maps, and calculate the illumination map by adding respective partial illumination maps of the illuminants.

In operation 650, e.g., dependent on the estimation in operation 640, the image correction apparatus adjusts the chromaticity information based on an illuminant selected or set to be preserved. When the chromaticity information is adjusted, an illumination map for preserving information of a portion of the illuminants may ultimately be generated. When the chromaticity information is not adjusted, an illumination map for removing a color cast by all the illuminants may ultimately be generated. Such an adjusting of the chromaticity information will be further described with reference to FIG. 7.

In operation 660, the image correction apparatus generates an image by applying the generated illumination map to the input image. When the chromaticity information is adjusted, the image correction apparatus generates an image that preserves therein a portion of color casts. Thus, the image correction apparatus may perform white balancing separately for each illumination.

Figure 7:
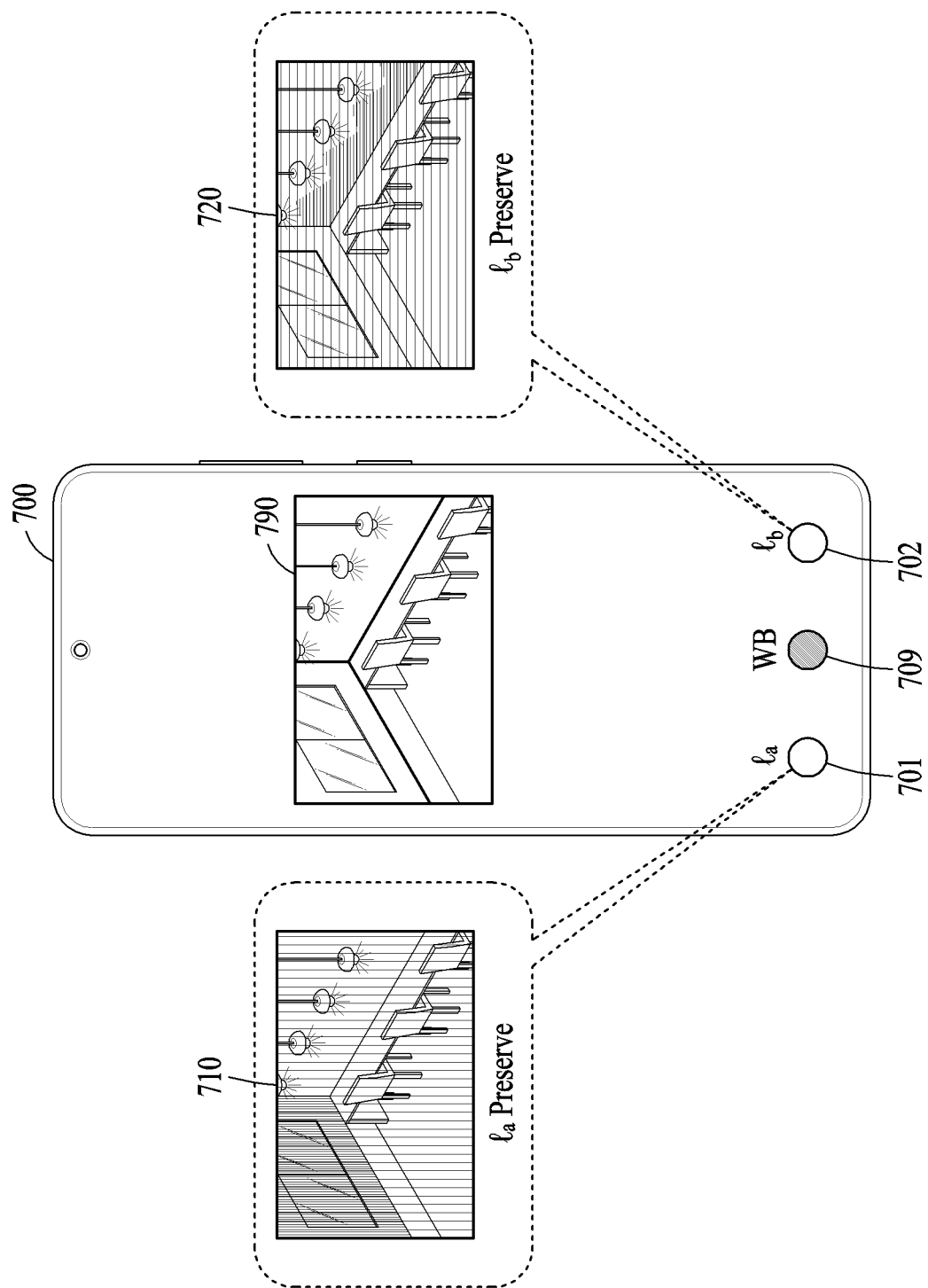
FIG. 7 illustrates an example of preserving an illumination component by a portion of illuminants.

FIG. 7 illustrates an example of preserving an illumination component by a portion of illuminants.

In an example, the image correction apparatus may be an electronic apparatus 700 (e.g., a mobile terminal) as illustrated in FIG. 7, but examples of which are not limited thereto. Examples exist with the electronic apparatus 700 being any of various devices including an image sensor, a tablet, augmented reality (AR) glasses, a vehicle, a television (TV), and the like, as non-limiting examples. Additionally or alternatively, and as a non-limiting example, the image correction apparatus may correspond to the image correction apparatus 1000 of FIG. 10.

In response to a user input 709, the electronic apparatus 700 may output, e.g., to a display or other components or operations of the electronic apparatus, a white-balanced image 790 generated as described above with reference to FIGS. 1 through 6. In addition, the electronic apparatus 700 may provide a user interface that can provide, e.g., display, information for a selection of an illuminant to be preserved. For example, in response to a user input in the user interface to identify the user selection, the electronic apparatus 700 may perform white balancing with an exclusion of a white balancing for an illumination effect corresponding to a user's preference, e.g., the electronic apparatus 700 may selectively apply white balancing only to the remaining illumination effect(s). In addition, or alternatively, the user may select or identify those illumination effect(s) that the user wants to be white balanced, and the electronic apparatus 700 may determine to not perform white balancing on remaining illumination effect(s) that the user did not select or identify.

As an example of the selective application of the white balancing based on the user's preference, the electronic apparatus 700 may preserve chromaticity information of a target illuminant selected by a user input, and change chromaticity information of remaining illuminant(s) to white information. For example, the electronic apparatus 700 may calculate a partial illumination map of the target illuminant based on the preserved chromaticity information, calculate a remaining illumination map based on the white information, and generate a relighting map by adding the partial illumination map and the remaining illumination map together, such as described above with reference to FIG. 4. The electronic apparatus 700 may generate a relighted image by applying the relighting map to the white-balanced image 790. In an example the generated relighted image may be output, such as through the display, and/or provided to the other components or operations of the electronic apparatus 700.

In the example of FIG. 7, the electronic apparatus 700 may obtain a first relighted image 710 by applying, to the white-balanced image 790, a relighting map that is generated by substituting second chromaticity information of a second illuminant with white information (e.g., a vector (1,1,1)) in response to a user input 701. The electronic apparatus 700 may also obtain a second relighted image 720 by applying, to the white-balanced image 790, a relighting map that is generated by substituting first chromaticity information of a first illuminant with white information in response to a user input 702. Thus, the electronic apparatus 700 may perform white balancing selectively based on a user's preference.

In another example, the image correction apparatus may change chromaticity information of each illuminant in response to a user input. The image correction apparatus may change a chromaticity of a color cast by a portion of illuminants. The electronic apparatus 700 may change a chromaticity of a target illuminant, and thus change a chromaticity of an illumination effect of a portion of the illuminants to a chromaticity desired by a user. Thus, the electronic apparatus 700 may apply white balance selectively to a portion of illuminants, and generate a white-balanced image in various ways based on a user's selection while ensuring vividness of a scene.

Figure 8:
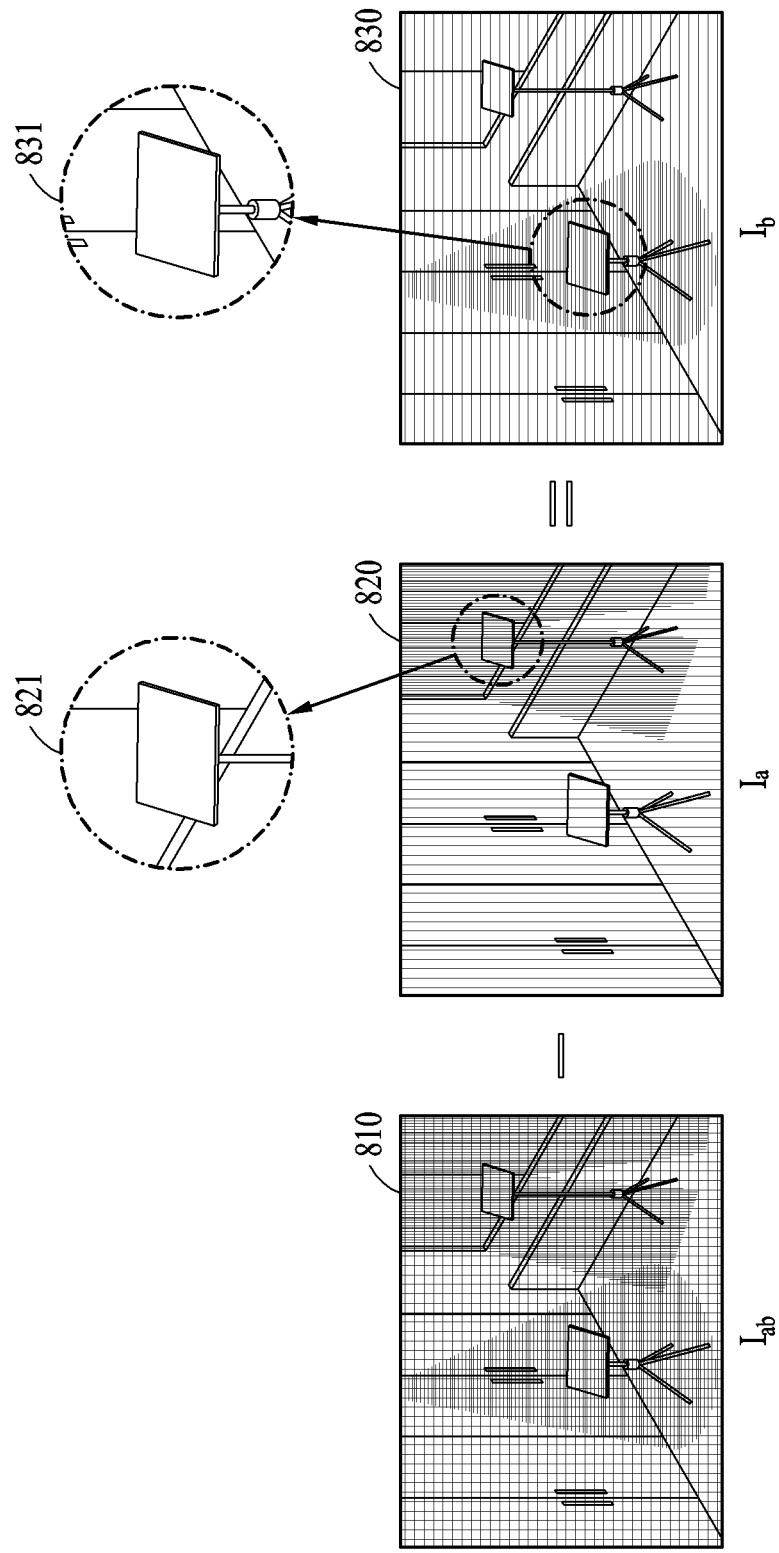
FIGS. 8 and 9 illustrate examples of collecting training data for use to train a neural network.
Figure 9:
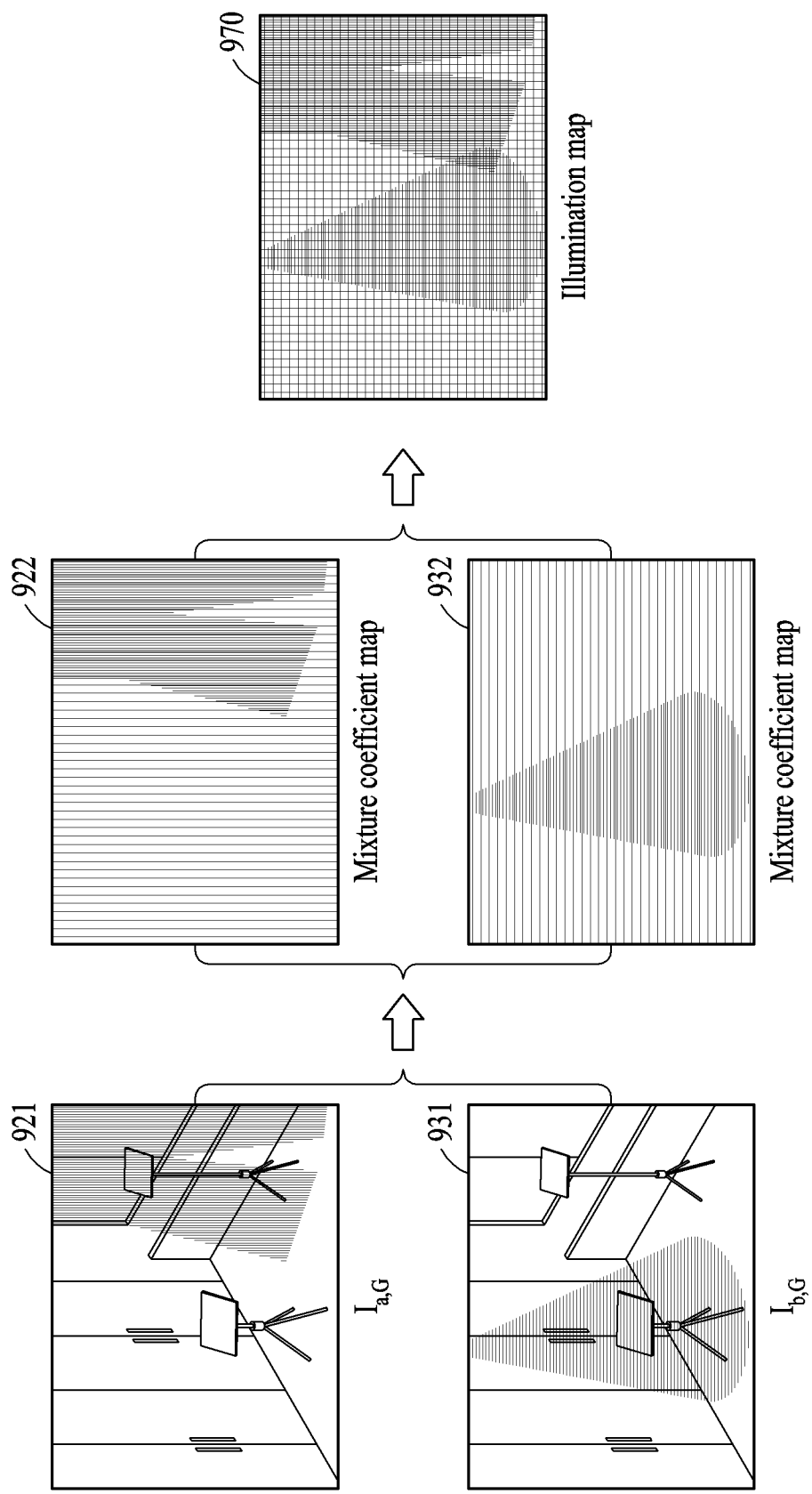

FIGS. 8 and 9 illustrate examples of collecting training data for use to train a neural network.

In an example, a training dataset may be collected, e.g., by the image correction apparatus, a training apparatus, and/or a server, to train a neural network model (e.g., a CNN, a HDRnet, a U-net, etc.) to generate an illumination map, or chromaticity information and a mixture coefficient map for each illuminant. The training dataset may be a large-scale multi-illumination (LSMI) dataset for multi-illumination white balancing. For example, the training dataset may include images of various scenes having a pixel-level ground truth illumination map. In an example, the training dataset may include training images of various scenes, and ground truth chromaticity information and a ground truth mixture coefficient map for each illuminant corresponding to each of the training images.

As an example, the training apparatus may augment input training data by changing mixture coefficient values of the mixture coefficient maps.

Figure 10:
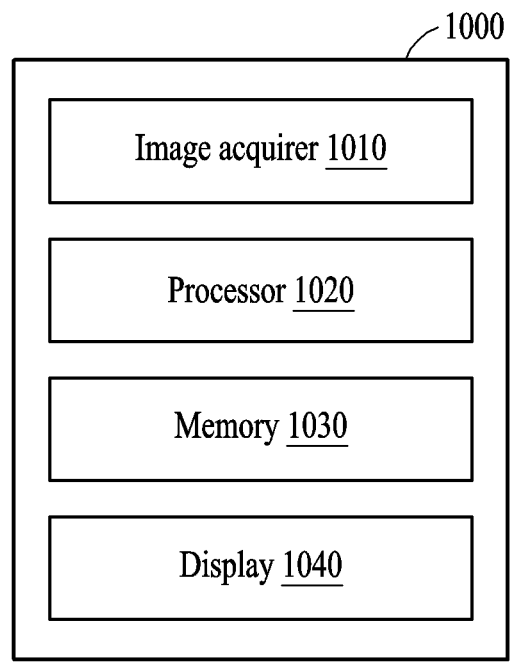
FIG. 10 illustrates an example of a hardware-implemented image correction apparatus.

In one or more non-limiting examples, the training apparatus may have a configuration of the image correction apparatus 1000 of FIG. 10, e.g., with the training apparatus including at least a/the processor 1020 and a/the memory 1030, such as where one or more of the processors 1020 implement the training and one or more of the memories store in-training and the resultant trained neural networks, as well as training data, temporary data generated during the training of the neural network, and instructions that when executed by the one or more processors 1020 configure the one or more processors 1020 to implement the training operations. For example, the training apparatus may be configured to perform training without the above discussed inference operation of white balancing an input image, or may be configured to perform the training and the subsequent inference operation of white balancing of the input image. Likewise, references herein to an image correction apparatus are also references to the performance or implementation of such inference operations of the white balancing of an input image by the image correction apparatus, and may as well be references to the training of the neural network and the subsequent performance or implementation of such inference operations of the white balancing of the input image using the trained neural network.

In an example, an image of a scene having a single illumination may be captured, and a single illumination effect present in the scene may be estimated through a white balance method using a color checker, a grey card, a spider cube, or the like, for example. A virtual illumination map may be randomly generated and applied to a white-balanced image obtained under the single illumination, and a virtual training image to which a mixed illumination is applied may be obtained.

In the example of FIG. 8, a training image $I_{ab}$ 810 may be an image captured in a state in which both an illuminant a and an illuminant b are turned on when the image was captured. In this example, the illuminant a may indicate a natural light entering through a window, and the illuminant b may indicate an indoor light by an illuminant or lighting installed indoors. The illuminant a may not be controllable, but the illuminant b may be controllable. Thus, an image $I_a$ 820 may be captured in a state in which the illuminant b is turned off. The training image $I_{ab}$ 810 may be captured at various locations in a real world, such as, for example, an office, a studio, a living room, a bedroom, a restaurant, a cafe, and the like, for scene diversity.

Although the illuminant a is not turned off, the image $I_a$ 820 may be subtracted from the training image $I_{ab}$ 810 as represented by Equation 8 below, for example, and thus an image $I_b$ 830 under the illuminant b may be obtained.

$$I_b = r \odot (\eta_b \ell_b)$$

$$= r \odot (\eta_a \ell_a + \eta_b \ell_b) - r \odot (\eta_a \ell_a)$$

$$= I_{ab} - I_a.$$

Equation 8

A ground truth chromaticity of an individual illuminant may be individually estimated using color charts 821 and 831 (e.g., Macbeth color charts) disposed in a scene in each image, a color checker, a grey card, a spider cube, or the like. A ground truth mixture coefficient map may be estimated as represented by Equation 9 below, for example.

$$\alpha(x) = \frac{\eta_a(x)}{\eta_a(x) + \eta_b(x)}$$

$$\approx \frac{I_{a,G}(x)}{I_{a,G}(x) + I_{b,G}(x)}$$

Equation 9

A camera sensor and/or image sensor that uses a Bayer pattern of an RGB color system may have a greater number of elements that sense a G color in the same area size compared to the number of elements that sense the R color or the B color, and thus an intensity value of a green channel may be approximated to brightness. By Equation 9 above, the ground truth mixture coefficient map that indicates a ratio of mixed chromaticities of individual illuminants may be obtained at each pixel level. For example, as illustrated in FIG. 9, a green channel image $I_{a,G}$ 921 may be obtained from the image $I_a$, and a green channel image $I_{b,G}$ 931 may be obtained from the image $I_b$. The training apparatus may normalize a green value of each of the green channel images $I_{a,G}$ 921 and $I_{b,G}$ 931 to be 1 to obtain a mixture coefficient map 922 of the illuminant a and a mixture coefficient map 932 of the illuminant b. A ground truth illumination map 970 may then be estimated by adding a product of chromaticity information and the mixture coefficient map 932 of the illuminant b to a product of chromaticity information and the mixture coefficient map 922 of the illuminant a. As described above with reference to FIGS. 8 and 9, a training dataset obtained in a real world may be augmented through an application of random illumination information to the training dataset obtained in the real world.

The training apparatus may generate a neural network model, for example, the neural network models 210 and 410 as non-limiting examples, by using the training dataset obtained as described above. For example, the training apparatus may ultimately generate the neural network model 410 of FIG. 4 by training a temporary or in-training neural network model using, as a training output, a virtual training image, and ground truth chromaticity information and a ground truth mixture coefficient map that are used to augment the training image. In an additional or alternate example, the training apparatus may ultimately generate the neural network model 210 of FIG. 3 by training a temporary or in-training neural network model using, as a training output, a virtual training image and a corresponding ground truth illumination map. The training apparatus may input a training image to the temporary or in-training neural network model, calculate a loss between a temporary output of the temporary or in-training neural network model and a training output (e.g., a ground truth illumination map, ground truth chromaticity information, and a ground truth mixture coefficient map), and repeatedly update parameters of the temporary or in-training neural network model until the calculated loss becomes less than a threshold loss, as non-limiting examples.

The ultimately trained neural network model may be or include, as non-limiting examples, a HDRnet and a U-net. For example, in a case in which the neural network models 210 and 410 of FIGS. 3 and 4 are each implemented as U-nets, an increased performance may be achieved.

FIG. 10 illustrates an example of a hardware-implemented image correction apparatus.

Referring to FIG. 10, an image correction apparatus 1000 includes an image acquirer 1010, a processor 1020, a memory 1030, and a display 1040, as non-limiting examples.

The image acquirer 1010 may obtain an input image. The image acquirer 1010 may include at least one of an image sensor configured to capture the input image, a communicator configured to receive the input image, and/or merely read the input image from the memory 1030.

The processor 1020 may generate a white-balanced image and/or a relighted image from the input image using a neural network model stored in the memory 1030. In an example, the processor 1020 may generate, from the obtained input image and by using the neural network model, an illumination map including illumination values that indicate color casts by which chromaticities of a plurality of illuminants individually affect each pixel of the input image. The processor 1020 may generate an image, which may be output such as through display 1040 and/or provided to other components or operations of the image correction apparatus, by removing at least a portion of the color casts from the input image using the generated illumination map, noting that operations of the processor 1020 are not limited to the foregoing. The processor 1020 may perform any one, any combination, or all of the above described operations and/or methods described above with reference to FIGS. 1 through 9.

The memory 1030 may store one or more of the neural network models. The memory 1030 may temporarily or permanently store data required to perform any one, and combination, or all image correction operations and/or methods described herein. For example, the memory 1030 may store the input image, the generated image and/or the relighted image, e.g., for the output or display by display 1040 and/or provision to other components or operations for corresponding control of the image correction apparatus 1000 dependent on the generated image and/or the relighted image. In addition, in one or more examples the memory 1030 may temporarily or permanently store data and instructions to perform any one, and combination, or all training operations and/or methods described herein, with or without performance of the inference operations of the image correction of the input image. Descriptions herein of instructions that may be stored in the memory of the image correction apparatus, training apparatus, or electronic apparatus are computer readable or implementable instructions stored in the memory or other non-transitory medium, which when executed by the processor 1020, for example, configure the processor 1020 to implement any one, any combination, or all operations and methods described herein.

As noted above, the display 1040 may display the generated image. The display 1040 may also visualize the input image and/or the relighted image. The display may also provide a user interface to the user with respect to which or all illuminants to white balance correct.

In an example, the image correction apparatus 1000 may selectively perform white balancing on illumination effects by all the illuminants in the image by estimating the illumination map, e.g., of the same size as the input image. For example, the image correction apparatus 1000 may estimate chromaticity information and a mixture coefficient map for each of the illuminants and selectively correct a mixed illumination effect. The image correction apparatus 1000 may also perform pixel-level white balancing, and thus a chromaticity and amount of a color cast that is compensated for in and/or removed from one pixel of the image may differ from a chromaticity and amount of a color cast that is compensated for in and/or removed from another pixel of the image.

The image correction apparatus 1000 may be an image processing apparatus that uses deep image processing, artificial intelligence (AI) computing or machine learning, such as to generate the illumination map or to extract the chromaticity information and coefficient maps, and one or more of the processors 1020 and/or a specially configured machine learning processor, such a neural processing unit (NPU) or hardware accelerator, configured to implement such deep image processing, artificial intelligence (AI) computing or machine learning. The image correction apparatus 1000 may be for example, a mobile camera, general camera, an image processing server, a mobile terminal, AR glasses, a vehicle, and the like. As non-limiting examples, any of the mobile camera, general camera, mobile terminal, AR glasses, and vehicle may include one or more of the image sensor(s) configured with the corresponding camera(s) of the image acquirer 1010 of any of the mobile camera, general camera, mobile terminal, AR glasses, and vehicle. As non-limiting examples, examples include the image correction apparatus 1000 being configured to perform a recognizing and/or tracking of a feature in the captured image, as well image classification, object tracking, optical flow estimation, depth estimation, etc. For example, the memory 1030 may store instructions executable by the processor 1020 and/or corresponding neural networks for any of or any combination of such image classification, object tracking, optical flow estimation, depth estimation. Accordingly, in such one or more examples, confusion in object recognition due to an illumination or lighting may be reduced, and robustness may be improved accordingly, when the white balanced image is used for the object recognition compared to the use of the non-white balanced captured image for such object recognition, as a non-limiting example.

The image correction apparatuses, the training apparatuses, the electronic apparatuses, processors, NPUs, hardware accelerators, the image correction apparatus 1000, the image acquirer 1010, the processor 1020, the memory 1030, the display 1040, and other apparatuses and devices, units, and components described herein with respect to FIGS. 1-10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, as well as one or more systolic arrays in combination therewith as a non-limiting example, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, as well as one or more systolic arrays in combination therewith, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:

generating, by a neural network model provided an input image, an illumination map comprising illumination values dependent on respective color casts by corresponding plural illuminants, of multiple illuminants affecting the input image, affecting each of a plurality of pixels of the input image; and generating a white-adjusted image by removing at least a portion of all color casts from the input image using the generated illumination map, wherein the generating of the illumination map includes generating the illumination map, based on the multiple illuminants, to include a respective illumination value for each pixel in the input image, and wherein the generating of the white-adjusted image includes:

determining chromaticity information corresponding to each of the multiple illuminants by decomposing the illumination map with respect to each of the multiple illuminants; and generating, by adjusting the white-adjusted image, a partially white-balanced image with preserved chromaticity information corresponding to a portion of the multiple illuminants, and chromaticity information corresponding to a remaining portion of the multiple illuminants being white information corresponding to the remaining portion of the multiple illuminants.

2. The method of claim 1, wherein the generated illumination map includes an illumination vector in which a partial illumination vector corresponding to a chromaticity of one of the multiple illuminants and another partial illumination vector corresponding to a chromaticity of another illuminant of the multiple illuminants are mixed, for at least one pixel of the input image.

3. The method of claim 1, wherein the illumination map includes a mixture coefficient of chromaticities of the corresponding one or more illuminants affecting a pixel of the input image that is different from another mixture coefficient of the chromaticities of the corresponding one or more illuminants affecting another pixel of the input image.

4. The method of claim 1, wherein a result of the neural network model includes, for a pixel of the input image, first chromaticity information for a first illuminant of the corresponding one or more illuminants and a corresponding first mixture coefficient, and the result of the neural network model further includes, for another pixel of the input image, second chromaticity information for the first illuminant of the one or more illuminants and a corresponding second mixture coefficient.

5. The method of claim 4, wherein the generating of the illumination map includes generating a first pixel of the illumination map based on the first chromaticity information and the first mixture coefficient, and generating a second pixel of the illumination map based on the second chromaticity information and the second mixture coefficient.

6. The method of claim 1, wherein the generating of the white-adjusted image comprises:
generating the white-adjusted image by applying the illumination map to the input image through an element-wise operation.

7. The method of claim 6, wherein the applying of the illumination map to the input image through the element-wise operation includes dividing respective pixel values of each pixel at corresponding pixel locations in the input image by respective illumination values at same pixel locations in the illumination map as the corresponding pixel locations.

8. The method of claim 1, wherein the white-adjusted image is a white-balanced image.

9. The method of claim 1, further comprising controlling a display to display the partially white-balanced image.

10. The method of claim 1,
wherein the determining further comprises determining a mixture coefficient corresponding to each of the multiple illuminants by the decomposing of the illumination map with respect to each of the multiple illuminants, and
wherein the generating of the partially white-balanced image comprises:
generating a partial illumination map corresponding to the portion of the multiple illuminants using the chromaticity information corresponding to the portion of the multiple illuminants and respective mixture coefficient maps corresponding to the portion of the multiple illuminants;
generating a remaining illumination map corresponding to the remaining portion of the illuminants using the white information corresponding to the remaining portion of the multiple illuminants and a corresponding mixture coefficient map corresponding to the remaining portion of the multiple illuminants;
generating a relighting map by adding the partial illumination map and the remaining illumination map together; and
multiplying a pixel value of each pixel of the white-adjusted image by a relighting value corresponding to a pixel position of a corresponding pixel among relighting values of the relighting map.

11. A processor-implemented method, the method comprising:
generating, using a neural network model provided an input image, an illumination map comprising illumination values dependent on respective color casts by corresponding plural illuminants, of multiple illuminants affecting the input image, affecting each of a plurality of pixels of the input image; and
generating a white-adjusted image by removing at least a portion of all color casts from the input image using the generated illumination map,
wherein the generating of the illumination map comprises:
respectively extracting chromaticity information of each of the multiple illuminants and a mixture coefficient map of each of the multiple illuminants by the neural network model; and
generating the illumination map, based on the extracted chromaticity information and the extracted mixture coefficient maps, to include a respective illumination value for each pixel in the input image, and
wherein the generating of the white-adjusted image comprises:
determining chromaticity information, among the extracted chromaticity information, corresponding to a target illuminant among the multiple illuminants;
calculating a partial illumination map for the target illuminant by multiplying the determined chromaticity information and a corresponding mixture coefficient map among the extracted coefficient maps;
generating a relighting map by adding the partial illumination map of the target illuminant and a remaining illumination map for a remaining portion of the multiple illuminants; and
generating a partially white-balanced relighted image by applying the relighting map to the white-adjusted image, wherein the generated partially white-balanced relighted image preserves at least a target portion, of the all color casts, corresponding to the target illuminant.

12. The method of claim 11, wherein the generating of the illumination map comprises:
calculating a partial illumination map for each of the multiple illuminants by respectively multiplying the chromaticity information of each of the multiple illuminants and the mixture coefficient map of each of the multiple illuminants; and
generating the illumination map by adding together the calculated partial illumination maps.

13. The method of claim 11, wherein the determining of the chromaticity information corresponding to the target illuminant comprises:

changing chromaticity information, among the extracted chromaticity information and corresponding to a remaining portion of the multiple illuminants, to white information.

14. The method of claim 11, further comprising:

determining a mixture coefficient map of each of the multiple illuminants such that a sum of mixture coefficients calculated with respect to the corresponding one or more illuminants for one pixel is a reference value;

calculating a partial illumination map corresponding to each of the multiple illuminants respectively based on chromaticity information of each of the multiple illuminants and a mixture coefficient map of each of the multiple illuminants; and applying the calculated partial illumination map to one of the input image and the white-adjusted image.

15. The method of claim 14, wherein the determining of the mixture coefficient maps comprises:

identifying a total number of illuminant chromaticities that affect pixels in the input image; and generating the respective mixture coefficient maps corresponding to the total number of the identified illuminant chromaticities.

16. The method of claim 15, wherein the identifying of the total number of the illuminant chromaticities comprises:

setting the total number of the illuminant chromaticities to be three.

17. The method of claim 15, wherein the generating of the respective mixture coefficient maps comprises:

initiating the generating of the respective mixture coefficient maps in response to the total number of the illuminant chromaticities being identified to be at least two.

18. The method of claim 14, wherein the determining of the mixture coefficient maps comprises:

estimating a mixture coefficient map of one of two illuminants when a total number of the illuminant chromaticities is two illuminant chromaticities; and calculating a remaining mixture coefficient map of a remaining other illuminant of the two illuminants by subtracting each mixture coefficient, of the estimated mixture coefficient map, from the reference value.

19. A non-transitory computer-readable storage medium storing instructions that, when executed by a processor, cause the processor to perform the image correction method of claim 1.

20. An apparatus, comprising:

a processor; and a memory storing one or more machine learning models and instructions, which when executed by the processor, configure the processor to:

generate, by one of the one or more machine learning models, an illumination map comprising illumination values dependent on respective color casts by respective plural illuminants, of multiple illuminants affecting an input image, affecting each of a plurality of pixels of the input image; and generate a white-adjusted image by adjusting at least a portion of all color casts from the input image using the generated illumination map, wherein the generation of the illumination map includes a generation of the illumination map, based on the multiple illuminants, having respective illumination values for each pixel in the input image, and wherein the processor is further configured to determine chromaticity information corresponding to each of the multiple illuminants by decomposing the illumination map with respect to each of the multiple illuminants, and generate, by adjusting the white-adjusted image, a partially white-balanced image with preserved chromaticity information corresponding to a portion of the multiple illuminants, and different chromaticity information corresponding to a remaining portion of the multiple illuminants, compared to corresponding chromaticity information in the illumination map.

21. The apparatus of claim 20, wherein the different chromaticity information is white information.

22. The apparatus of claim 20, wherein the processor is further configured to:

decompose the illumination map, with respect to each of the multiple illuminants, to obtain chromaticity information of the multiple illuminants; and generate, by adjusting the white-adjusted image, a partially white-balanced image with preserved chromaticity information corresponding to a portion of the multiple illuminants, and different chromaticity information corresponding to a remaining portion of the multiple illuminants, compared to the obtained chromaticity information.

23. The apparatus of claim 22, wherein the different chromaticity information is white information.

24. The apparatus of claim 20, further comprising an image sensor configured to capture the input image.

25. The apparatus of claim 24, wherein the instructions further include instructions, which when executed by the processor, configure the processor to control an operation of the apparatus dependent on the white-adjusted image.

26. The apparatus of claim 20, wherein the instructions further include instructions, which when executed by the processor, configure the processor to identify a respective total number of the respective one or more illuminants that affect the pixels in the input image, and wherein the use of the one of the one or more machine learning models includes selecting, based on the identified total number of the respective one or more illuminants being greater than one for one pixel, the one machine learning model from among the two or more machine learning models stored in the memory, with two different machine learning models being selected for two respectively different total numbers of illuminants for different pixels.

27. An apparatus, comprising:

an image sensor configured to obtain an input image; and a processor configured to:

generate, by a neural network model provided an input image, an illumination map comprising illumination values dependent on respective color casts by corresponding plural illuminants, of multiple illuminants affecting the input image, affecting each of a plurality of pixels of the input image; and generate a white-balanced image by removing at least a portion of all color casts from the input image using the generated illumination map, wherein the generation of the illumination map includes a generation of the illumination map, based on the multiple illuminants, to include a respective illumination value for each pixel in the input image, and wherein the processor is further configured to generate, by adjusting the white-balanced image, a partially white-balanced image with preserved chromaticity information corresponding to a portion of the multiple illuminants, and different chromaticity information corresponding to a remaining portion of the multiple illuminants, compared to corresponding chromaticity information in the illumination map.

28. The apparatus of claim 27, further comprising a display, wherein the processor is further configured to cause the display to display the white-balanced image.

* * * * *